3,373,049
METHOD FOR BONDING SILICEOUS FIBERS TO SILICONE RUBBER
Siegfried Nitzsche and Karl-Heinrich Wegehaupt, Burghausen, Bavaria, Germany, assignors to Wacker-Chemie G.m.b.H., Munich, Bavaria, Germany
No Drawing. Filed July 5, 1963, Ser. No. 293,127
Claims priority, application Germany, July 11, 1962, W 32,599
6 Claims. (Cl. 117—76)

This invention relates to a novel method for adhering siliceous materials, particularly materials prepared from glass fibers or asbestos fibers, to silicone rubbers.

Commercially available glass fibers in the form of yarns, tapes, mats, woven fabrics and the like are usually finished with a carbohydrate-containing size or primer. The organic size or primer on the glass fiber serves as a so-called lubricant in the preparation of yarns and cloth. Such sizings on glass are undesirable when the glass is used in conjunction with silicone rubber because the sizing interferes with obtaining good bonding between the glass and the rubber and the sizing is deficient in heat stability hence the combination of sized-glass and silicone rubber has low heat stability limited by the sizing.

The glass fibers can be freed of sizing by known procedures, particularly by heating to decompose the organic sizing. The de-sized glass fibers can be used without further treatment or they can be finished with heat-stable agents such as a methacrylato chromic chloride. The glass fibers, untreated or finished, can be combined with silicone rubber to produce laminates, supported tapes, rubbery sheets with fabric backings, and similar combinations, exhibiting acceptable heat stability. However, it has been found that the bond between such glass cloth and the silicone rubber is generally unsatisfactory. The bond-strength is inconsistent and generally too low for practical use.

Many pretreatments and finishes have been proposed for siliceous materials to assist in obtaining an adequate degree of bonding between the siliceous material and various synthetic resins. For example, the use of trifunctional alkenyl silanes in preparing organic resin-glass fiber laminates is well known. Furthermore, alkoxysilylmethylamines have been employed as primers on glass fibers used in preparing laminates with condensation resins such as aldehyde, epoxy and urethane resins. Finally, a heat hardenable primer employed in aqueous solutions to increase the adherence of glass fibers to organosiloxane polymers has been prepared by cumbersome, expensive methods employing a mixture of vinyltrialkoxysilanes and alkylalkoxysilanes with ethylene glycol. This primer produces adhesion between glass cloth and siloxane measured at between 2 and 3 kg./cm. severing load.

It is the object of this invention to produce a primer or finishing agent for application to siliceous materials to secure excellent adhesion of such materials to silicone rubbers. An inexpensive and procedurally simple method for priming glass cloth is also an object of this invention. A further object is a method of bonding silicone rubber to glass cloth or asbestos cloth to secure a uniform, high strength bond. Other objects and advantages of this invention are detailed in or will be apparent from the disclosure and claims following.

This invention is a method consisting of treating siliceous material by applying mixtures of halogenosilanes of the formulae $SiX_4$ and $R_3SiX$ with or without $R_2SiX_2$, wherein X is a halogen atom and R is a monovalent hydrocarbon or halogenohydrocarbon radical, to the siliceous material, exposing the treated siliceous material to atmospheric moisture, contacting the siliceous material with a silicone rubber stock and vulcanizing the silicone rubber stock.

This invention is operative with a wide variety of siliceous materials. Preferably the materials are yarns, cloths, sheets, tapes and fibrous forms of glass and asbestos. The siliceous material can be free of sizing or it can be finished with commercial finishes such as the methacrylato chromic chloride mentioned above. Although the invention is directed primarily to fibers of siliceous material, solid sheets of glass as well as powders or particles of silica, quartz, glass frit and other forms of siliceous material can be used.

The silanes employed as treating agents are mixtures of 10 to 85 mol percent silicon tetrahalide ($SiX_4$), 15 to 90 mol percent of triorganohalogenosilane ($R_3SiX$) and 0 to 50 mol percent of diorganodihalogenosilane ($R_2SiX_2$). The best results are achieved with mixtures of 20 to 60 mol percent $SiX_4$, 40 to 80 mol percent $R_3SiX$ and up to 30 mol percent $R_2SiX_2$. In these formulae, each X is a halogen atom, preferably chlorine or bromine but including fluorine and iodine. In general, the X groups bonded to any one silicon are the same but they can be different as in dibromodichlorosilane, iodotrichlorosilane and dimethylchlorofluorosilane. Each R is a monovalent substituent bonded to silicon by C—Si bonding selected from alkyl radicals such as methyl, ethyl, propyl, butyl, nonyl and octadecyl; aryl radicals such as phenyl, naphthyl, diphenyl, and anthracyl; alkaryl radicals such as tolyl, xylyl, ethylphenyl and methylnaphthyl; aralkyl radicals such as benzyl and phenylethyl; cycloaliphatic radicals such as cyclopropyl, cyclobutyl, cyclohexyl, cyclopentyl, cyclohexenyl, cyclopentenyl and cyclobutenyl; and alkenyl radicals such as vinyl, allyl, methallyl, hexenyl and octadecenyl; as well as halogenohydrocarbon radicals such as chloro-, bromo- and iodo-methyl, perchloroethyl, 3,3,3-trifluoropropyl, bromophenyl, bromochloronaphthyl, chlorotolyl, bromobenzyl, chlorocyclopropyl, cyclobromopentenyl, chlorovinyl, fluoroallyl and chlorohexyl. In any molecule containing R groups, the R groups can be the same as in trimethylchlorosilane and diphenyldichlorosilane or they can be different as in phenyldimethylchlorosilane, phenylmethylvinylchlorosilane, ethylmethyldichlorosilane and ethylphenyldichlorosilane. Mixtures of silane species of any individual formula are also operative. Preferred silanes have chlorine atoms and the R groups are selected from methyl, ethyl, vinyl and phenyl radicals.

The siliceous material can be treated with the silanes by any desired method. One effective method consists of dissolving the silanes in an inert organic solvent to produce a solution containing 0.1 to 10 percent by weight of silane and contacting the siliceous material with the solution. Any organic solvent chemically inert to the silanes can be employed such as benzene, toluene, petroleum hydrocarbons and similar solvents.

The siliceous material is brought into contact with the silane solution by any desired method such as spraying, flowing, dipping, brushing, calendering and any other desired method. The solvent is evaporated and the treated siliceous material is exposed to atmospheric moisture for several hours.

Alternatively, the mixture of silanes can be applied in vapor form. The pure silanes are vaporized in a closed container and the siliceous material is exposed to the vapors until the desired degree of surface treatment is achieved, usually 15 minutes to 24 hours, preferably 30 minutes to 3 hours, at room temperature and normal pressure. Of course, elevated temperatures and reduced or elevated pressure can be employed thus varying the time of exposure required to achieve the desired degree of treatment. Again, the treated siliceous material is exposed to atmospheric moisture for 1–48 hours prior to further processing of the material. The period of exposure to atmospheric moisture depends upon temperature and humidity. Higher temperatures and humidities shorten this period of time. The exposure to atmospheric moisture effects hydrolysis of the silanes and is completed when the silanes are fully hydrolyzed.

The treated siliceous material exhibits excellent adhesion to silicone rubber stocks. The silicone rubber stocks are well known articles of commerce and are based upon essentially linear diorganosiloxane polymers of units of the formula

where R is as above defined and $n$ has an average value from 1.95 to 2.01. Such polymers can vary from relatively low molecular weight polymers of 10,000 cs. viscosity at 25° C. up to high polymers which are gum-like and have viscosities of $10^7$ cs. at 25° C. or more. Such polymers are fully described in the art in such U.S. Patents as Nos. 2,842,516; 2,860,083; 2,999,077; 3,032,528; 3,046,160; 3,050,490; 3,050,491; 3,061,578; 3,065,194; 3,070,559; 3,070,566; 3,070,567 and 2,890,188. The fillers, vulcanizing agents, compression set additives, pigments, heat stability additives and other ingredients in the proportions known and disclosed in the art, particularly the foregoing patents, can be present in the rubber stocks employed herein.

The silicone rubber stock can be employed in any desired unvulcanized form including dispersion in solvents and sheets. The rubber stock is applied to the siliceous material by any appropriate method including calendering, pressing, coating, dipping, flowing and any method whereby intimate contact between the rubber stock and the siliceous material is achieved. The silicone rubber stock is vulcanized by appropriate techniques. Thus, if the vulcanizing agent is activated by heat, the rubber stock is heated at 100°–200° C., under pressure if necessary or desirable, until the vulcanization is completed. Further heat curing may be desirable. When the well-known room temperature vulcanizing systems are employed (e.g., a hydroxyl endblocked polymer admixed with a polyfunctional cross-linking agent and a curing catalyst) the vulcanization is affected by exposure of the stock to water vapor in the air or to water in other form.

As can be seen from the foregoing, the precise formulation of the silicone rubber stock is not critical. The siliceous material is firmly adhered to any of the silicone rubber formulations by the method of this invention. The presence of alkenyl radicals in the siloxane polymer of the silicone rubber stock has no particular influence on the adhesion ultimately achieved. The alkenyl groups can be replaced by alkyl, aryl or other groups and the same degree of adhesion is achieved. Furthermore, the use of alkyltrihalogenosilanes or alkenyltrihalogenosilanes as treating agents produces only a minimal improvement in adhesion between siliceous material and silicone rubber in contrast to the excellent improvement in adhesion achieved when said trihalogenosilanes are employed in glass-fiber-synthetic organic resin laminates.

The siliceous materials coated with or adhered to silicone rubber can be employed in a wide variety of applications such as hoses, tubes, conveyor belts, press-cured forms of any desired shape, insulating tapes for electrical or heat insulation or both, protective coverings on glass, safety glass, laminates of various complexity, sheet insulation, and any other use in which siliceous material-silicone rubber combinations can be employed.

The following examples are included to assist in understanding and practicing this invention and do not restrict the scope of the invention. All parts and percentages are based on weight unless otherwise stated.

*Example 1*

A glass fiber cloth 1 m. wide finished with a methacrylato chromic chloride and rolled to form a roll averaging 80 layers per cross-sectional radius of the roll, was placed in a closed, 80 liter polyethylene bag. The glass cloth was of a linen weave characterized as U.S. quality 128–150 (German quality 91/120/100). An open vessel containing 200 ml. of a silane mixture of 39 mol percent $SiCl_4$ and 61 mol percent $(CH_3)_3SiCl$ was placed in the bottom of the polyethylene bag untouched by the roll of glass cloth. The glass cloth remained in the closed polyethylene bag in contact with the silane vapors for 2 hours at room temperature. The roll of glass cloth was then removed from the polyethylene bag and exposed to normal atmosphere for 12 hours.

Test pieces were cut from the inner layer, from an intermediate layer near the center of the radius of the roll and from the outer layer of the treated roll. Each test piece was coated with a 4 mm. thick layer of a silicone rubber stock consisting of 100 parts dimethylsiloxane polymer of 800,000 molecular weight containing about .07 mol percent vinyl substituents based on the siloxane units, 40 parts fume silica (surface area measured by BET method of 200 square meters per gram), 10 parts methyl silicon resin having a methyl to silicon ratio of 1.2/1 and an ethoxy content of 8 per cent as a masticating agent, and 0.5 part dibenzoyl peroxide in 0.5 part dimethylsiloxane oil. The coated test pieces were heated for 15 minutes at 150° C. under 15 atmospheres pressure to vulcanize the rubber. This was followed by a heat cure of 12 hours at 150° C. and 2 hours at 200° C. in an air circulating oven. Each of the test pieces was examined and tested. The silicone rubber was so firmly bonded to the glass cloth that it was not possible to separate the glass cloth from the silicone rubber layer without rupturing either the glass cloth or the silicone rubber or both. The resulting adhesion between glass cloth and silicone rubber exceeded the cohesion of the glass cloth and the silicone rubber.

A glass cloth control prepared from the same materials described above but not exposed to the silane vapors could be separated from the silicone rubber without damage to glass cloth or to silicone rubber. The two materials could be separated by exerting only 0.2 kg./cm. tape width.

*Example 2*

A piece of glass cloth as described in Example 1 was suspended in a closed container for 30 minutes. The vessel contained an open beaker with a mixture of 20 mol percent $SiCl_4$, 52 mol percent $(CH_3)_3SiCl$ and 28 mol percent $(CH_3)_2SiCl_2$ which was not in contact with the glass cloth. The cloth remained in the closed container for 30 minutes and was then removed and exposed to the atmosphere for two hours. The treated cloth was coated with a 2 mm. thick layer of soft milled silicone rubber stock which was applied firmly with a hand roller. The silicone rubber stock was a mixture of 100 parts of the dimethylsiloxane polymer of Example 1, 80 parts diatomaceous earth filler, 80 parts titanium dioxide filler and 1 part of 2,4-dichlorobenzoyl peroxide dispersed in 1 part dimethylsiloxane oil.

The silicone rubber stock-glass cloth assembly was vulcanized and post-cured in an air circulating oven by heating at 150° C. for 12 hours followed by 2 hours at 200° C. at normal pressure. The glass cloth was so firmly adhered to the silicone rubber that it was not possible to separate the glass cloth from the silicone rubber layer without damaging the cloth or the rubber or both.

A glass cloth control sample, identical in every way to the treated glass cloth except it was not exposed to the silane vapors, coated with the same rubber formulation and in all other ways prepared as above, was easily removed from the silicone rubber. A severing load of only 0.2 kg./cm. width removed the glass cloth from the silicone rubber without damage to either one.

Example 3

A mixture of 30 mol percent SiCl$_4$, 40 mol percent C$_6$H$_5$(CH$_3$)$_2$SiCl, 20 mol percent (CH$_3$)$_2$SiCl$_2$ and 10 mol percent C$_6$H$_5$(CH$_3$)SiCl$_2$ was dissolved in benzene to give a 2 percent silane solution. A piece of glass cloth of the quality described in Example 1 was dipped in the solution. The glass cloth was removed from the solution and exposed to the atmosphere for 12 hours. The treated cloth was then covered with the silicone rubber stock and with the techniques described in Example 1. The glass cloth adhered so strongly to the silicone rubber that it could only be separated by exerting a severing load exceeding 8 kg./cm. tape width while a control sample untreated with the silanes was easily separated under a severing load of 0.2 kg./cm. tape width.

Example 4

A piece of glass cloth freed of sizing as described in Example 5 was suspended for 30 minutes in a closed vessel in which a chlorosilane atmosphere had been created from a mixture of 39 mol percent SiCl$_4$ and 61 mol percent (CH$_3$)$_3$SiCl. The glass cloth was removed from the vessel and exposed to the atmosphere for two hours. The glass cloth was then coated with a room temperature vulcanizing silicone rubber stock consisting of 100 parts hydroxy endblocked dimethylsiloxane polymer of 30,000 cs. viscosity at 25° C., 50 parts diatomaceous earth, 0.5 part dibutyl tin dilaurate and 1.5 parts ethylpolysilicate. The rubber stock vulcanized at room temperature in contact with the atmosphere within two hours. The resulting rubber adhered so firmly to the glass cloth that separation of the bond between glass cloth and rubber was not possible. In a control test, the same type of glass cloth not treated with the silanes was easily separated from the vulcanized rubber.

Example 5

A roll of glass cloth tape 15 cm. wide having 40 layers per cross-section of radius in the roll was made up of a low-twist, alkali-free glass yarn with a linen weave and a thread count of 6 x 7/cm. The cloth was de-sized by heating at 300°–600° C. to about 0.1 percent by weight of the textile. The roll was kept for two hours in a closed vessel with a volume of 8 liters. At the bottom of the closed vessel there was an open cup containing 100 ml. of a silane mixture of 32 mol percent SiCl$_4$, 58 mol percent (CH$_3$)$_3$SiCl and 10 mol percent

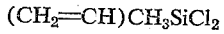

$$(CH_2=CH)CH_3SiCl_2$$

untouched by the glass cloth. Samples were cut from the inner, the center and the outer layers of the glass cloth roll thus impregnated. Each sample of glass cloth was covered with a 3 mm. layer of silicone rubber stock consisting of 100 parts dimethylsiloxane polymer of 800,000 molecular weight, 4 parts fume silica, 2 parts dibenzoyl peroxide in 2 parts dimethylsiloxane oil. The assemblies were press vulcanized at 30 atmospheres and 150° C. for 20 minutes followed by a post cure in an air circulating oven for 12 hours at 150° C. and 2 hours at 200° C. The glass cloth adhered to the silicone rubber in each of the samples so strongly that a severing load of 8–10 kg./cm. of tape width was required to separate the glass cloth from the silicone rubber. Another sample treated identically with untreated glass cloth of the same quality required a severing load of only 0.192 kg./cm. tape width to separate the glass cloth from the silicone rubber.

Example 6

A piece of asbestos cloth with a twill weave, a thread count of 4 x 4/cm. and a thickness of 2.2 mm. was sized with silane as in Example 4. The treated asbestos cloth was then covered with a silicone rubber stock as in Example 4. The silicone rubber stock vulcanized and adhered to the asbestos cloth so tenaciously that it was not possible to separate the rubber from the asbestos cloth without tearing them. An identical covering on the untreated asbestos cloth was easily pulled off.

Example 7

Equivalent results were achieved when Example 3 was repeated employing mixtures of silanes containing 30 mol percent SiCl$_4$, 40 mol percent (C$_6$H$_5$)$_2$CH$_3$SiCl or (C$_6$H$_5$)$_3$SiCl or (C$_2$H$_5$)$_2$CH$_3$SiCl or

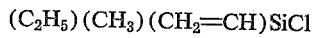

$$(C_2H_5)(CH_3)(CH_2=CH)SiCl$$

or CH$_3$CH$_2$CH$_2$(CH$_3$)$_2$SiCl or C$_5$H$_{11}$(CH$_3$)$_2$SiCl or (CH$_3$)$_3$SiBr or (CH$_3$C$_6$H$_4$)(CH$_3$)$_2$SiBr or

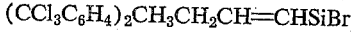

$$(CCl_3C_6H_4)_2CH_3CH_2CH=CHSiBr$$

or C$_n$H$_{2n+1}$)$_3$SiCl where $n$ is an integer of 1–18, 20 mol percent (CH$_3$)$_2$SiCl$_2$ and 10 mol percent (C$_2$H$_5$)$_2$SiCl$_2$, or C$_2$H$_5$(CH$_2$=CH)SiCl$_2$ or CF$_3$CH$_2$CH$_2$(CH$_3$)SiCl$_2$ or (CF$_3$CH$_2$CH$_2$)$_2$SiBr$_2$ or CH$_3$C$_6$H$_4$(CH$_3$)SiCl$_2$ or

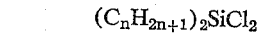

$$(C_nH_{2n+1})_2SiCl_2$$

where $n$ is an integer from 1–18.

That which is claimed is:

1. A method for adhering silicone rubber to a siliceous substrate consisting essentially of
   (1) contacting the substrate with a mixture of silanes containing 10 to 85 mol percent of silicon tetrahalide, 15 to 90 mol percent of triorganohalogenosilane and 0 to 50 mol percent of diorganodihalogenosilane in each of said silanes the organic substituents being selected from the group consisting of monovalent hydrocarbon and halogenohydrocarbon radicals,
   (2) exposing the substrate treated in (1) to atmospheric moisture to effect hydrolysis of the silanes,
   (3) coating the substrate with a silicone rubber stock, and
   (4) vulcanizing the silicone rubber stock.

2. The method of claim 1 further characterized in that the mixture of silanes employed contains 20–60 mol percent SiCl$_4$, 40 to 80 mol percent (CH$_3$)$_3$SiCl and 0–30 mol percent (CH$_3$)$_2$SiCl$_2$.

3. The method of claim 1 further characterized in that the silanes are employed as a solution in an inert solvent containing 0.1 to 10 percent by weight of the silanes.

4. The method of claim 1 further characterized in that the silane mixture is applied to the substrate in vapor form.

5. The method of claim 1 wherein the siliceous substrate is composed of glass fibers.

6. The method of claim 1 wherein the siliceous substrate is composed of asbestos fibers.

References Cited

UNITED STATES PATENTS

| | | | |
|---|---|---|---|
| 2,412,470 | 12/1946 | Norton | 117—106 |
| 2,601,337 | 6/1952 | Smith-Johannsen | 117—54 X |
| 2,751,314 | 6/1956 | Keil | 117—161 X |
| 2,974,063 | 3/1961 | Bobear et al. | 117—161 X |
| 3,053,687 | 9/1962 | Bobear | 117—126 X |

WILLIAM D. MARTIN, *Primary Examiner.*

R. HUSACK, *Assistant Examiner.*